United States Patent Office 3,121,972
Patented Feb. 25, 1964

3,121,972
SOIL AND METHOD OF IMPROVING
William G. Lloyd, Bay City, and Carleton W. Roberts and Bernard J. Thiegs, Midland, Mich., assignors to The Dow Chemical Company, Midland, Mich., a corporation of Delaware
No Drawing. Filed June 21, 1961, Ser. No. 118,502
4 Claims. (Cl. 47—1)

This invention concerns methods for improving the physical structure of soils. More particularly, the invention concerns improving soil by applying to soil an onium polymer of the group consisting of water-soluble high molecular weight polymeric ar-vinylaryl sulfonium halides and water-soluble high molecular weight polymeric ar-vinylaryl quaternary nitrogen halides wherein halide is bromide or chloride.

The process of this invention affords an unobvious application of the aforesaid water-soluble high molecular weight quaternary onium polymers to the art of soil improvement. Until the present time, it was not suspected that such quaternary onium polymers would prove useful in improving soil.

The water-soluble high molecular weight polymeric sulfonium halide polymers used in the process of this invention are made by reacting a high molecular weight chloromethylated or bromomethylated vinylaryl polymer or an aqueous latex of a high molecular weight polymeric vinylbenzyl chloride or bromide with a substantially stoichiometric proportion, benzylic halide basis, of an organic sulfide of the dialkyl, polymethylene, di(hydroxyalkyl) or alkyl hydroxyalkyl type at a temperature between about 20° and 70° C. The products are water-soluble high molecular weight vinylbenzyl sulfonium halide polymers having the indicated sulfonium groups on 65 to 98% of the available aryl nuclei. By "water-soluble" is meant a time-stable, visually homogeneous solution in water. The organic sulfides used in the reaction have alkyl and/or hydroxyalkyl groups containing up to 4 carbon atoms or polymethylene groups containing up to 5 carbon atoms, respectively. While reaction involves substantially stoichiometric proportions (from 0.9 to 1.1 mole of sulfide per side chain halide), it is preferred to use an excess of sulfide reactant, advantageously up to about twice that of theory. Since the sulfide can be recovered, the amount of its excess is immaterial. Water, lower monohydric alcohols having up to 4 carbon atoms, glycols having up to 4 carbon atoms, and aqueous solutions of such alcohols and glycols dissolve the product resin and are useful reaction media. A reaction temperature of 20° to 70° C. is used, depending upon the volatility of the sulfide. Below 20° C., the reaction rate is uneconomic, while above 70° C., benzylic chloride is subject to hydrolysis.

The intermediate aqueous latex of a high molecular weight polymeric vinylbenzyl halide, used to make the onium resins used in the process of this invention, is made by emulsion polymerizing an oil-in-water emulsion containing between about 5 and 100 weight percent of a monomer mixture of about 0 to 1 weight percent of a crosslinking agent having two vinylidene groups, the balance being vinylbenzyl chloride or bromide, about 0.5–10 weight percent of a synthetic organic anionic pH stable emulsifier, monomer basis, about 0.1–1 weight percent of a water-soluble peroxy initiator, monomer equivalent, a weight equivalent of a water-soluble reducing activator, initiator basis, up to ca. 100 p.p.m. of a chain transfer agent, if desired, the balance being water. The polymerization temperature is varied between about 0° and 30° C. The polymerization time, dependent upon temperature, is varied between about 2 and 60 hours. A coagulum-free linear or lightly crosslinked aqueous latex is thereby obtained having a polymer particle diameter between about 300 A. and 3,000 A. and a molecular weight of about 15 million to 15 billion for crosslinked polymers having 0.05 to 1 weight percent of combined crosslinking agent, 0.2 to 2 million for the linear polymers and 2 million to 15 million for branched polymers having up to about 0.04 weight percent of combined crosslinking agent.

Alternatively, there can be used a high molecular weight chloromethylated or bromomethylated vinylaryl polymer, prepared by halomethylating a low temperature suspension polymer of 0 to 1 weight percent of a crosslinking agent having two non-conjugated vinylidene groups, the balance of monomer being a polymerizable vinylaryl monomer such as vinylbenzene, its homologs and analogs.

The water-soluble high molecular weight polymeric ar-vinylaryl quaternary nitrogen halides used in the process of this invention are made by reacting a halomethylated vinylaryl polymer or an aqueous latex of a high molecular weight polymeric vinylbenzyl halide, as described above, with a substantially stoichiometric proportion, halide basis, of an alicyclic tertiary amine, a tertiary amine having alkyl and/or hydroxy alkyl substituents containing from 1 to 4 carbon atoms, e.g., trimethyl, triethyl, tripropyl, tributyl, dimethyl hydroxyethyl, methyl bis(hydroxypropyl), etc. or with morpholine, pyridine, quinoline, isoquinoline or their monoalkylated or polyalkylated derivatives having 1 to 4 carbon atom alkyl group substituents, at a temperature between about −15° and 100° C. The products are water-soluble high molecular weight vinylbenzyl quaternary ammonium halide polymers or analogous polymeric quaternary nitrogen heterocyclic halides. By the term "water-soluble" is meant a time-stable, visually homogeneous solution in water. While reaction involves substantially stoichiometric proportions (from 0.9 to 1.1 mole of tertiary amine or nitrogen heterocyclic compound per side chain halide), it is preferred to use an excess of nitrogen compound, advantageously up to about twice that of theory. Since the tertiary amine, morpholine, pyridine, quinoline and isoquinoline reactants can be recovered, the amount of their excess is immaterial. Water, liquid water-miscible solvents such as lower monohydric alcohols, polyhydric alcohols, ketones, and ethers, usually all having up to 4 carbon atoms, and aqueous solutions of such water-miscible solvents, dissolve the product resin and are useful reaction media. A reaction temperature of about −15° to about 100° C. is used, depending somewhat upon volatility of the tertiary amine or equivalent nitrogen compound. Thereby polymeric products are obtained having on 65 to 98% of the available aryl nuclei a substituent of the group consisting of —CH$_2$N(R$_1$)(R$_2$)(R$_3$)Y, —CH$_2$PyY —CH$_2$QY, —CH$_2$IQY and —CH$_2$MY, wherein R$_1$, R$_2$ and R$_3$ individually are selected from the group consisting of alkyl and hydroxyalkyl groups having 1 to 4 carbon atoms, Py is a 1-pyridinium group, Q is a 1-quinolinium group, IQ is a 2-isoquinolinium group, M is a 4-morpholinium group, and Y is a chloride or bromide anion.

The high molecular weight resinous polymeric onium resins used in the process of this invention can be applied to the soil following usual soil improving techniques. Thus, they can be applied dry to the surface of the soil and admixed therewith, or alternatively, they can be applied in aqueous solution. Conventional discing or harrowing procedures are advantageously used to admix soil and onium resin.

In practice, the rate of application of these soil conditioning compositions will vary with the particular type used, with the soil type and with the degree of improvement desired. In general, an amount of onium polymer ranging between about 0.01 and 2 weight percent, preferably between 0.05 and 1 weight percent, dry soil basis, gives advantageous results. For economy of application, only the soil being cultivated need be treated. Aqueous solutions of the onium resins containing at least 0.1 weight percent up to a saturated solution are advantageously used.

The following representative example describes completely specific embodiments and illustrates the best mode contemplated by the inventors of carrying out the invention.

EXAMPLE

A series of treated soil samples was prepared in each of which 30 ml. of an aqueous 0.5% solution of one of the onium resins identified below was incorporated per 300 grams of air-dried Miami silt loam. The rate of application of onium resin was 0.05% based on the weight of soil. Each treated soil was transferred to a brass percolation tube and the soil height was adjusted to 6.5 inches. The treated soil was allowed to stand in said tube for 72 hours before water percolation was started. Percolation was then started and a constant head of water kept on each soil column for 8 hours. The volume of water which percolated through the soil in the 8-hour period was measured and the average percolation rate in ml. per hour was calculated.

The height of the soil column was then measured to determine how much the soil had settled during the percolation process. After draining the soil column overnight, it was removed from the percolation tube and weighed to determine the percent water retention. A 200-gram sample of the wet soil was wet-sieved through a double screen (with 1.19 mm. and 0.5 mm. openings) to determine the percentage of water-stable aggregates greater than 0.5 mm.

The results obtained are reported in the following table:

*Table*

SUMMARY OF SOIL PERCOLATION TEST

| Resin Used | Percolation, ml./hr. | Percent Water-Stable Aggregates >0.5 mm. | Percent Water Retention | Column Height, inches |
|---|---|---|---|---|
| Untreated control | 175 | 12.0 | 34.0 | 5.25 |
| 1 | 2,860 | 21.0 | 40.7 | 6.50 |
| 2 | 2,600 | 18.0 | 43.7 | 6.50 |
| 3 | 3,130 | 20.0 | 42.3 | 6.50 |
| 4 | 2,920 | 20.0 | 39.3 | 6.50 |
| 5 | 3,040 | 18.0 | 43.3 | 6.50 |
| 6 | 1,940 | 19.0 | 40.7 | 6.37 |
| 7 | 2,490 | 17.0 | 43.0 | 6.50 |

1 is poly(trimethyl(ar-vinylbenzyl)ammonium chloride), high molecular wt. linear polymer.
2 is poly(dimethyl(ar-vinylbenzyl)sulfonium chloride), high molecular wt., crosslinked with 0.05% divinylbenzene.
3 is poly(1-(ar-vinylbenzyl)pyridinium chloride), high molecular wt., crosslinked with 0.05% divinylbenzene.
4 is poly(1-(ar-vinylbenzyl)-2-picolinium chloride), high molecular wt., crosslinked with 0.05% divinylbenzene.
5 is poly(trimethyl(ar-vinylbenzyl)ammonium chloride), high molecular wt., crosslinked with 0.05% divinylbenzene.
6 is poly(4-(ar-vinylbenzyl)-4-methylmorpholinium chloride), high molecular wt., crosslinked with 0.05% divinylbenzene.
7 is poly(1-(ar-vinylbenzyl)-2,4-lutidinium chloride), high molecular wt., crosslinked with 0.05% divinylbenzene.

The onium resins evaluated above gave very good percolation rates and percent water retentions and maintained the original column height of the soil.

As the percentage of onium polymer is increased from 0.01 to 2 weight percent, air-dried soil basis, the percent water-stable aggregates greater than 0.5 mm. in diameter gradually increases.

What is claimed is:
1. A method for improving soils by distributing in soil a water-soluble high molecular weight polymeric onium resin of the group consisting of polymeric ar-vinylaryl sulfonium halides wherein the aryl nuclei have substituent groups of the formula $-CH_2-S-(R_1)(R_2)Y$ wherein $R_1$ and $R_2$ individually are members of the group consisting of 1 to 4 carbon alkyl and hydroxyalkyl groups and together are a member of the group consisting of polymethylene groups containing up to 5 ring carbon atoms and Y is one of chloride and bromide; and polymeric ar-vinylaryl quaternary nitrogen halides wherein the aryl nuclei have substituents of the group consisting of

$$-CH_2N(R_1)(R_2)(R_3)Y$$

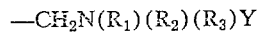

$-CH_2PyY$, $-CH_2QY$, $-CH_2IQY$, and $-CH_2MY$ wherein $R_1$, $R_2$ and $R_3$ individually are selected from the group consisting of 1 to 4 carbon alkyl and hydroxyalkyl groups; Py is a 1-pyridinium group; Q is a 1-quinolinium group; IQ is a 2-isoquinolinium group; M is a 4-morpholinium group; and Y is one of chloride and bromide; said substituent groups being present on substantially 65% to 98% of the available aryl nuclei; said onium resin being present in amount sufficient to improve the physical characteristics of the soil.

2. The method of claim 1 wherein the soil improving onium polymer is present in amount between 0.01 and 2 weight percent, air-dried soil basis.

3. An improved soil having distributed throughout its mass a water-soluble high molecular weight polymeric onium resin of the group consisting of polymeric ar-vinylaryl sulfonium halides wherein the aryl nuclei have substituent groups of the formula $-CH_2-S-(R_1)(R_2)Y$ wherein $R_1$ and $R_2$ individually are members of the group consisting of 1 to 4 carbon alkyl and hydroxyalkyl groups and together are a member of the group consisting of polymethylene groups containing up to 5 ring carbon atoms and Y is one of chloride and bromide; and polymeric ar-vinylaryl quaternary nitrogen halides wherein the aryl nuclei have substituents of the group consisting of $$-CH_2N(R_1)(R_2)(R_3)Y$$

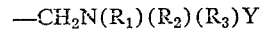

$-CH_2PyY$, $-CH_2QY$, $-CH_2IQY$ and $-CH_2MY$ wherein $R_1$, $R_2$ and $R_3$ individually are selected from the group consisting of 1 to 4 carbon alkyl and hydroxyalkyl groups; Py is a 1-pyridinium group; Q is a 1-quinolinium group; IQ is a 2-isoquinolinium group; M is a 4-morpholinium group; and Y is one of chloride and bromide; said substituent groups being present on substantially 65% to 98% of the available aryl nuclei; said onium resin being present in amount sufficient to improve the physical characteristics of the soil.

4. The soil of claim 3 having 0.01 to 2 weight percent, air-dried soil basis, of said onium resin.

References Cited in the file of this patent

UNITED STATES PATENTS

| 2,800,747 | Pitt | July 30, 1957 |
| 2,807,910 | Erickson | Oct. 1, 1957 |
| 2,895,925 | Hwa | July 21, 1959 |

OTHER REFERENCES

Highway Research Board Bulletin 108 on "Soil and Soil-Aggregate Stabilization," published 1955, by National Academy of Sciences, National Research Council, Washington, D.C., as their Publication 359. Pages 78 through 81 are relied on.